(12) United States Patent
Cannara et al.

(10) Patent No.: US 7,522,512 B1
(45) Date of Patent: Apr. 21, 2009

(54) SILICON CARBIDE INDENTS FOR PROBE STORAGE UTILIZING THERMOMECHANICALLY ACTIVATED POLYMER MEDIA

(75) Inventors: Rachel Cannara, Adliswil (CH); Bernd W. Gotsmann, Horgen (CH); Urs T. Duerig, Rueschlikon (CH); Harish Bhaskaran, Thalwil (CH); Armin W. Knoll, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/100,347

(22) Filed: Apr. 9, 2008

(51) Int. Cl.
*G11B 9/00* (2006.01)
(52) U.S. Cl. .................................................. 369/126
(58) Field of Classification Search ................. None
See application file for complete search history.

(56) References Cited

U.S. PATENT DOCUMENTS 4,645,703 A * 2/1987 Suzuki et al. ............... 428/141

7,393,699 B2 * 7/2008 Tran ............................. 438/1

\* cited by examiner

*Primary Examiner*—Joseph H Feild
*Assistant Examiner*—Parul Gupta
(74) *Attorney, Agent, or Firm*—Carpenter Patent Law; Robert K. Carpenter

(57) ABSTRACT

Storing data by forming permanent indents in a preceramic polymer, on a substrate, via a chemical reaction transforming the polymer through permanent phase change into hardened, ceramic material, where the chemical reaction activation energy is supplied by heat and pressure applied by a nanoscale probe tip; reading data with the tip by obtaining a topographical signal during readout of the bits; reading data with the tip, where the substrate and ceramic material are conducting, while recording varying electrical resistance measured through the tip-sample contact as the tip slides along the surface; where a separate surface layer formed over the ceramic material including a polymeric thin film with crosslinking protects the tip during writing and readout; and where the substrate is a rigid wall material that can aid indentation by preventing the precursor polymer from accommodating stress applied by the tip with plastic deformation.

1 Claim, 2 Drawing Sheets

Figure 1:
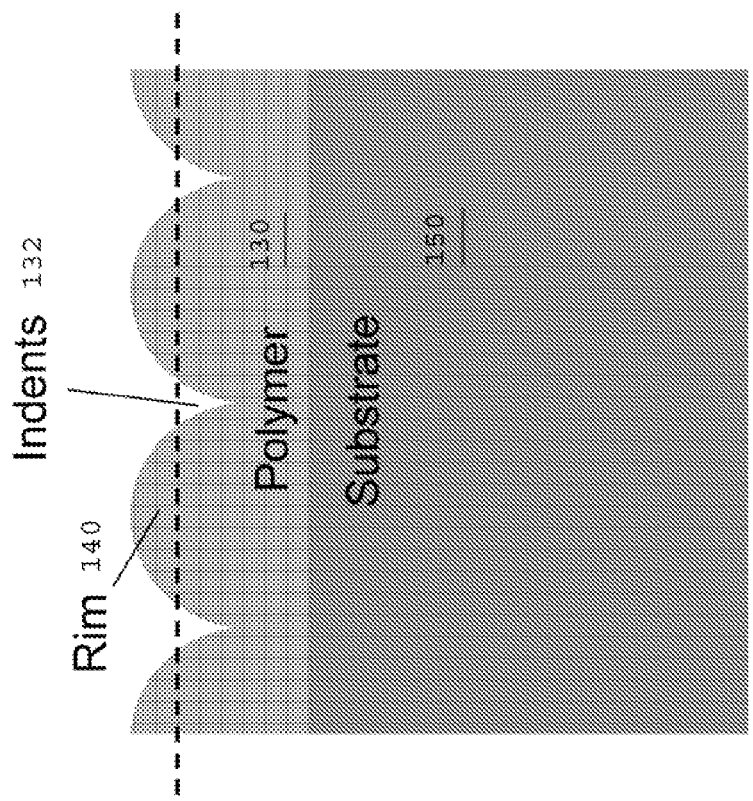

SILICON CARBIDE INDENTS FOR PROBE STORAGE UTILIZING THERMOMECHANICALLY ACTIVATED POLYMER MEDIA

CROSS-REFERENCE TO RELATED APPLICATIONS (Not Applicable)

STATEMENT REGARDING FEDERALLY SPONSORED RESEARCH OR DEVELOPMENT (Not Applicable)

THE NAMES OF THE PARTY TO A JOINT RESEARCH AGREEMENT (Not Applicable)

INCORPORATION-BY-REFERENCE OF MATERIAL SUBMITTED ON A COMPACT DISC (Not Applicable)

BACKGROUND OF THE INVENTION (1) Field of the Invention

This disclosure is directed to a method and apparatus for thermomechanically activating polymer media for the formation of silicon carbide indents for probe storage and to storing and reading data encoded by such indents.

(2) Description of Related Art Including Information Submitted Under 37 CFR 1.97 and 1.98

Allenspach et al. (U.S. Pat. No. 6,680,808) is representative of a magnetic millipede for ultra high density magnetic storage. According to the Allenspach et al. abstract, "a two-dimensional array of cantilevered tips . . . is advantageously used in an inventional storage system each of which tips serves as a heat source when it is activated by a current flowing through a resistive path within said tip . . . "

Frommer et al. (U.S. Published Patent Application No. 2005/0050258) discloses, in the abstract, that cross-linked "polymers are used as the recording layers, in atomic force microscopy data storage devices, giving significantly improved performance when compared to the previously reported linear polymers."

Despont et al. (U.S. Pat. No. 6,647,766) discloses that a "basic arrangement for thermomechanical writing and readout . . . [including for] writing binary information into [a] storage media . . . , the polymer surface is locally softened or melted with [a] heated tip . . . by simultaneously applying a light pressure onto the tip . . . by [a] cantilever . . . , resulting in nanometer-scale indentations in the surface of the storage media . . . representing the binary information in the form of indents" (see Despont et al. column 1, lines 44-57).

Bianconi et al. (U.S. Pat. No. 6,989,428) discloses "silicon carbide (SiC) ceramics that can be produced from poly(methylsilyne), as well as other ceramics, which can be produced from these precursors" (see the Bianconi et al. abstract). Also see U.S. Patent Publication No. 2004/0010108 to Bianconi et al.

BRIEF SUMMARY OF THE INVENTION

At least some aspects and embodiments of this disclosure are directed to a method of storing and reading data, including: storing data by forming permanent indents by thermomechanically activating a preceramic polymer, that is on a substrate, via a chemical reaction that transforms the polymer through a permanent phase change into a hardened, ceramic material, wherein the chemical reaction is activated with a prescribed activation energy supplied by heat and pressure applied by a nanoscale probe tip; reading the data with the nanoscale probe tip by obtaining a topographical signal during readout of the bits; reading the data with the nanoscale probe tip, wherein both the substrate and the locally-transformed ceramic material are conducting, by recording the varying electrical resistance measured through a tip-sample contact as the nanoscale probe tip slides along the surface; where a separate surface layer formed over the preceramic material comprising a polymeric thin film with or without cross-linking protects the probe tip during both writing and readout.

Other exemplary embodiments and advantages of this disclosure can be ascertained by reviewing the present disclosure and the accompanying drawings.

BRIEF DESCRIPTION OF THE SEVERAL VIEWS OF THE DRAWING(S)

Figure 2:
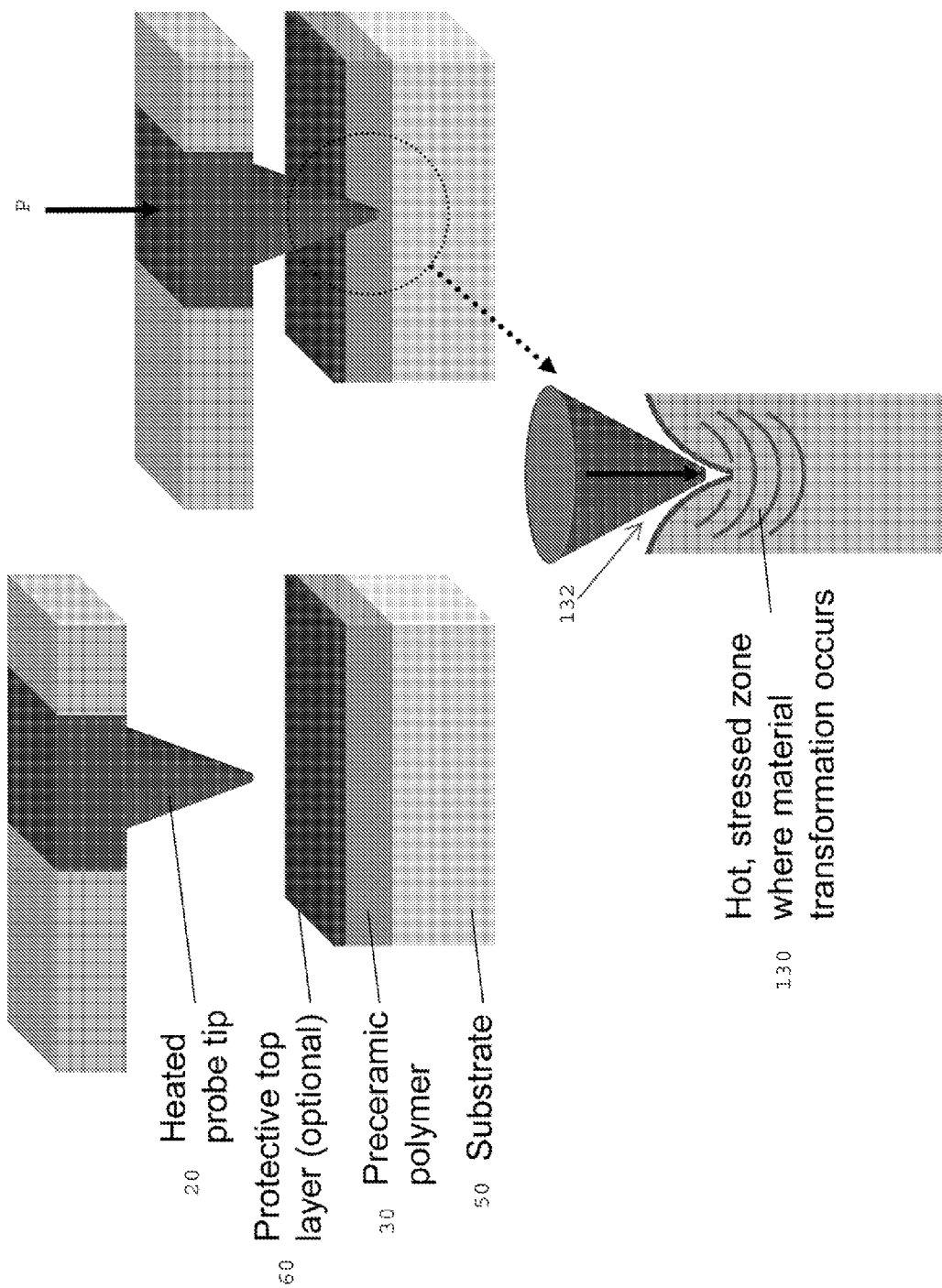

This disclosure is further described in the detailed description that follows, with reference to the drawings, in which:

FIG. 1 illustrates chemically-activated indents using tailored preceramic polymer media in accordance with at least some aspects of this disclosure; and FIG. 2 illustrates methodology for preparing chemically-activated indents using tailored preceramic polymer media in accordance with at least some aspects of this disclosure.

DETAILED DESCRIPTION OF THE INVENTION

Exemplary embodiments of this disclosure are described herein by way of example.

In general, tape storage devices can be too bulky for portable applications. In the data storage market, the volumes necessary to store magnetic media will quickly exceed reasonable space allocations, as the demand to archive increasing amounts of information accelerates. Alternatives to magnetics for storage technology can be expensive, and their less expensive incarnations do not guarantee data lifetimes of more than a few years. Storage faces other challenges, including limited solutions for achieving high densities, especially when combined with small form factors.

In the context of thermomechanical probe storage, the existing Millipede concept faces challenges that can include low bit retention, accidental erasure, and limited data rates. To achieve bit stability (i.e., bit retention), the indent should not relax despite the stress incorporated during the indentation process.

In order to minimize this stress, the load force during indent writing can be minimized and the write temperature should be sufficiently high. The time an indent should be held in its deformed state by the probe tip during the writing process can depend on the local temperature; consequently, the temperature of the contact zone should be elevated to compensate for shorter write times. The balance between indent time and retention for a given temperature can mean that one must sacrifice writing speeds or increase power consumption to achieve longer storage lifetimes. At writing times corresponding to more than 100 kb/s per tip, a solution for retention times longer than ten years is expected to be difficult to achieve. A data rate of 1 Mb/s or more as needed for data storage can require heat temperatures during write that can endanger the electrical and mechanical functionality of the cantilever/tip over longer times.

The storage density for polymer-based Millipede devices (with a single bit per indent) can be limited to less than 10 Terabit/in$^2$, due in large part to the pile-up of material which forms a rim around each indent (FIG. 1).

Possibilities for increasing density and data rate can include forming indents with varying depths, where the depth of an individual indent can correspond to an incremental number of bits (e.g., if 1 bit=1 nm, an indent of 2 nm is 2 bits, 3 nm is 3 bits, etc.). Utilizing multiple bits per indent and being able to discern between 1, 2, 3, 4 bits, etc. can depend on bit retention even more than in a single bit case. Therefore, high density applications can rely on a design that involves a bit-writing process which produces permanent indents.

The extent of the rim can increase for deeper indents, since pile-up can result from volume conservation of the indented material. The material can compensate for the deformation by squeezing out of the interface. The rim can correspond to a zero (or absence of a bit), and its height can be greater than the average height of the unindented polymer region. As a result, signal to noise ratios can be improved. The difference between the depth of the indent and adjacent zero can be enhanced by this additional rim height. At increased densities, however, the rim material can spill over into nearest neighboring bits, and the resulting overwrite can negate additional gains in storage density obtained by writing multiple bits per indent. Thus, the density limit for a given material can be defined, in part, by this boundary between high zeros and overwriting. An approach that avoids rim formation would enable development of devices with higher storage densities.

Other challenges of polymer storage media can include the desire to engineer materials that can be hard enough to retain bit shape post-indentation (leading to long media lifetimes), yet can be soft enough to avoid tip wear during bit formation and readout (leading to long tip lifetimes). In addition, the thickness of the polymer film should be high enough to avoid strain shielding, an effect where the rigid substrate can prevent sufficient bulk deformation of the polymer and can lead to excessive rim formation. This compromise between ideal write and read conditions can limit the applicability of simple polymers as storage media, and a new media approach would be beneficial to maintain the role of indent technology in storage applications.

Aspects and embodiments of this disclosure utilize the thermomechanical concept of probe storage to produce high densities (better than both magnetics and state-of-the-art probe storage), while also achieving high bit retention. Data are stored by forming permanent SiC indents via indenting a preceramic polymer (or polymer precursor) with a heated tip. This process is not dominated by the deformation mechanics of the polymer, but instead by a chemical reaction with a prescribed activation energy that can be supplied by the heat and/or pressure applied by the nanoscale probe tip. A chemical reaction transforms the polymer into a hardened, ceramic material (the process referred to as "thermolysis" or "pyrolysis").

Since the reaction results in a permanent phase change of the material (transforming the relatively soft polymer toward a ceramic state of variable stoichiometry), the indents are also permanent. In addition, patterning of ceramic indents can lead to localized volume reduction due to material densification and mass loss within the indented volume. This contraction of material can avoid rim formation, which would otherwise occur due to volume conservation of the polymer in its chemically unaltered state. Consequently, higher densities can be achieved without risking nearest-neighbor overwrite.

It is noted that the permanent nature of the indent can protect data from accidental erasure and can maintain bit readability over time.

The struggle between choosing a single polymer media that can be at once hard enough to retain bits yet soft enough to prevent tip wear is no longer a limitation for this indent process: The writing step can begin by indenting an extremely soft (rubbery) polymer, followed by forming extremely hard, and therefore permanent, indents; meanwhile, a separate surface layer including a polymer thin film with tailored morphology and chemistry, and preferably cross-linked, can be included to protect the tip during both writing and readout. This glassy (crosslinked) surface layer can be produced, for example, either by modification of the polymer precursor (by UV crosslinking) or by depositing a second crosslinked polymer using plasma deposition, by spin-coating, or transfer.

As opposed to the negative influence of the rigid substrate on thin film indentation, the phase change process can benefit from strain shielding effects: The rigid wall silicon (or tailored composite) substrate can aid the indentation process by preventing the polymer from accommodating the stress applied by the tip with plastic deformation. Instead, the polymer undergoes the phase transformation to a ceramic.

For all of the above, data is stored as indents, i.e. in a topographic state. In another embodiment, data can be encoded in the local resistivity of the media. If the precursor polymer thickness is low enough (<50 nm), the indent can reach the polymer-substrate interface, and the ceramic can bond to the substrate, further stabilizing the indent. If both the substrate and ceramic material are conducting, the topographical signal obtained during readout of the bits can be enhanced or replaced by recording the varying electrical resistance measured through the tip-sample contact as the tip slides along the surface.

FIG. 1 illustrates indents 132 and rims 140 formed in a preceramic polymer 130 on a substrate 150 in accordance with aspects and embodiments of this disclosure.

FIG. 2 illustrates at least one embodiment of the methodology of this disclosure featuring: chemically-activated indents using tailored preceramic polymer media.

A substrate 50 can be coated with a preceramic polymer 30 by spin-coating. The polymer 30 can be crosslinked partially or completely in a uniform or gradient fashion, or a thin, tailored surface layer 60 deposited on top of the preceramic polymer layer 30.

Polymethylsilyne (PMSy), $[(CH_3)SiH]_n$, is a high molecular weight preceramic polymer that forms silicon carbide in inert (e.g., argon) or chemically-active (e.g., ammonia) environments at temperatures above 200° C. and a pressure of 1 atm or above. PMSy was discovered recently to be a superior polymer precursor for silicon carbide materials, due to its high yield (of SiC from polymer) and its production of near-stoichiometric, defect-free SiC.

Alternatively, the preceramic polymer 30 can be deposited from a plasma. The monomers utilized for plasma deposition can be chosen, for example, from methylene, acetylene, and silane. By adjusting the plasma deposition parameters, namely the power to heat the plasma in a microwave of RF-plasma source, the degree of cross-linking of the prepolymer can be adjusted.

The film can subsequently be indented by the pressure "P" of a probe tip 20, converting the polymer precursor to a ceramic, and forming a stable indentation 132 that may be read as one or more bits.

The film thickness and indent parameters can be tuned so the extent of the transformed material reaches the substrate 50, where the indented material can form a chemical bond with the substrate (e.g., silicon or silicon carbide). Exemplary thicknesses can be from 20 nm to 100 nm.

Depending on the molecular content of the surrounding atmosphere, the indentation process can be tailored to produce a conducting silicon carbide material (e.g., N-doped SiC is produced by thermolysis of PMSy in an $NH_3$ environment). For the case of the plasma deposited polymer, N-doping can be obtained by adding corresponding nitrogen containing monomers to the plasma.

Again referring to FIG. 1, indents 132 are formed in a polymer 130 on a substrate 150. The original height of the (flat) polymer is indicated by the dashed line above which the rim 140 is formed.

FIG. 2 shows chemically-activated indents 132 utilizing tailored preceramic polymer 30 media on a substrate 50. For the exemplary embodiment illustrated in this schematic, silicon carbide is formed by indenting the preceramic polymer 30, PMSy, with a probe tip 20 that can, for example, be heated by a heater integrated into the cantilever or probe support structure. A protective top layer 60 prevents the ceramic from bonding with the tip 20. Since the SiC has a higher density than the PMSy (the volume may be approximately halved), rim formation is minimized.

The foregoing exemplary embodiments have been provided for the purpose of explanation and are in no way to be construed as limiting this disclosure. This disclosure is not limited to the particulars disclosed herein, but extends to all embodiments within the scope of the appended claims, and any equivalents thereof.

The invention claimed is:

1. A method of storing and reading data, comprising:
storing data by forming permanent indents by thermomechanically activating a preceramic polymer, that is on a substrate, via a chemical reaction that transforms the polymer through a permanent phase change into a hardened, ceramic material, wherein the chemical reaction is activated with a prescribed activation energy supplied by heat and pressure applied by a nanoscale probe tip;
reading the data with the nanoscale probe tip by obtaining a topographical signal during readout of the bits;
reading the data with the nanoscale probe tip, wherein both the substrate and the locally-transformed ceramic material are conducting, by recording the varying electrical resistance measured through a tip-sample contact as the nanoscale probe tip slides along the surface;
wherein a separate surface layer formed over the preceramic material comprising a polymeric thin film with or without cross-linking protects the probe tip during both writing and readout.

* * * * *